UNITED STATES PATENT OFFICE.

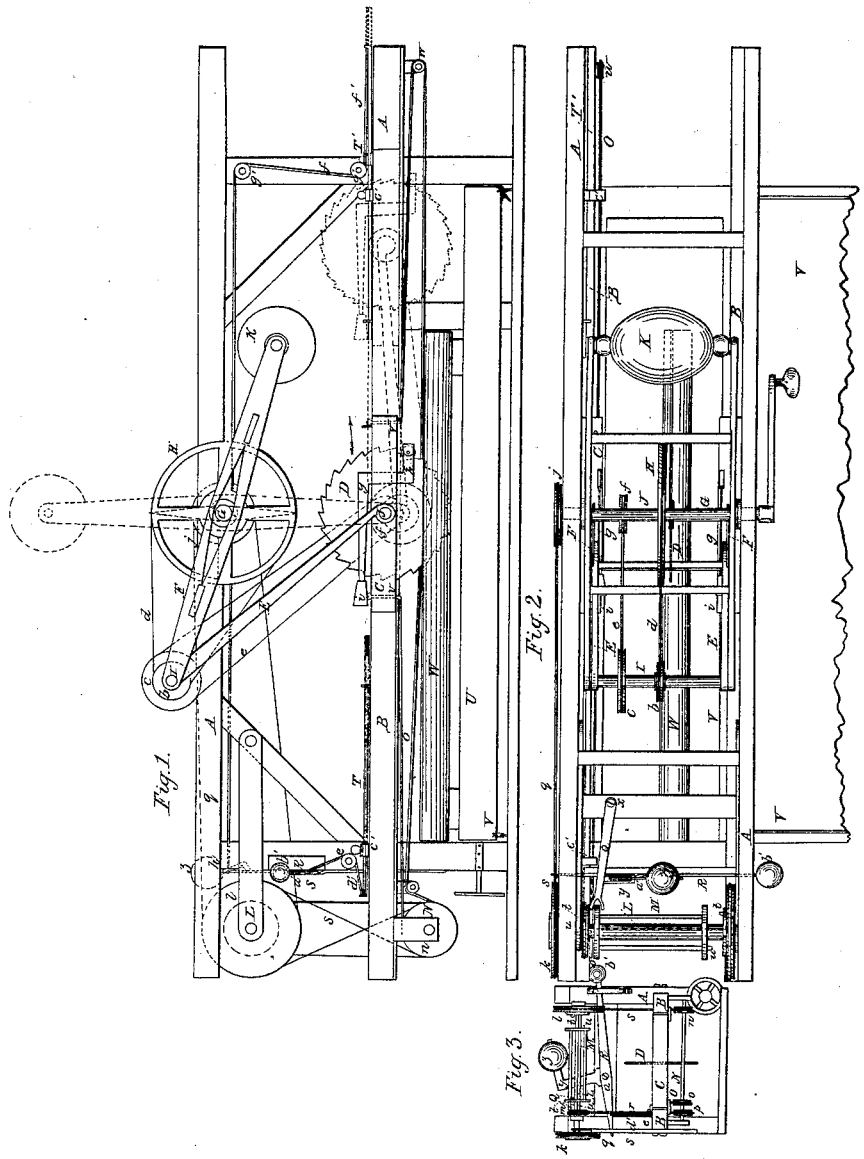

BENJAMIN FULGHUM, OF RICHMOND, INDIANA.

SAWING-MACHINE.

Specification of Letters Patent No. 11,693, dated September 19, 1854.

*To all whom it may concern:*

Be it known that I, BENJAMIN FULGHUM, of Richmond, in the county of Wayne and State of Indiana, have invented a new and Improved Machine for Sawing Timber; and I do hereby declare that the following is a full, clear, and exact description of the same, reference being had to the annexed drawings, making a part of this specification, in which—

Figure 1, is a side elevation of my improved machine, the side piece of the frame nearest the eye being removed. Fig. 2, is a plan or top view of ditto. Fig. 3, is an end view of ditto in elevation.

Similar letters of reference indicate corresponding parts in the several figures.

This invention relates to a new and improved machine for sawing timber, and consists in placing a saw within a carriage attached to a jointed frame, so arranged as to cause the saw to traverse over the stick of timber to be operated upon and perform its work, the stick remaining perfectly stationary.

The advantages of the machine and the construction of its several parts, will be hereafter fully explained.

To enable others skilled in the art to fully understand and construct my invention, I will proceed to describe it.

A, represents a frame constructed in any proper manner to support the working parts.

B, B, are ways parallel to each other and secured to the uprights of the frame A. Between the ways B, B, a carriage C, works, said carriage having a circular saw D, hung within it. The carriage C, is secured to the lower end of a frame E, the upper end of the frame E, being secured to one end of a frame F, hung on a shaft G, which passes through the center of the upper part of the frame A, said shaft G, having a driving pulley H, upon it.

The two frames, E, F, are connected together by a shaft I, the ends of which fit loosely in the frames. The shaft I, has two pulleys (*b*), (*c*), upon it. The pulley (*b*), has a belt (*d*), passing around it—said belt also passing around the driving pulley H. The pulley (*c*), has a belt (*e*), passing around it, said belt (*e*), also passing around a pulley (*f*), on the saw arbor J, see Figs. 1 and 2. On the end of the frame F, opposite to the end, through which the shaft I, passes, there is a counterpoise K. Through each side of the carriage C, a lever (*g*), passes, said levers having, at their lower ends, friction rollers (*h*), (*h*), which are made to bear upon the lower sides of the ways in consequence of weights (*i*), (*i*), at the outer ends of the levers. These friction rollers insure a steady motion of the carriage.

At one end of the shaft G, there is a pulley (*j*), and at one end of the frame A, and at its upper part, there is a pulley (*k*), hung upon a shaft L, which passes across the end of the frame A. The shaft L is of rectangular form, and has fixed upon it a sliding cylindrical frame M, and two pulleys (*l*) (*m*), the frame M, turning with the shaft L, and the pulleys (*l*), (*m*), being loose upon it.

N, is a transverse shaft at the lower part of the frame A, and underneath the shaft L. The shaft N, has three pulleys (*n*), (*o*), (*p*), upon it, said pulleys being permanently attached to the shaft N, see Fig. 3.

A belt (*q*), passes around the pulleys (*j*), (*k*), and a belt (*r*), passes around the pulleys (*p*), (*m*),—a cross belt (*s*), also passes around the pulleys (*n*), (*l*). The belts (*r*), (*s*), are distinctly shown in Fig. 3.

On the inner sides of the pulleys, (*l*), (*m*), on the shaft L, are pins (*t*), (*t*), and on the heads or ends of the cylindrical frame, M, are pins or projections (*u*), (*u*), one at each end. The use of these pins will be shown hereafter.

O, is a belt which is attached to the carriage C, at the points (*v*), (*v*), see Fig. 1. The belt O, passes around the pulley (*o*), on the shaft N, and around a pulley (*w*), at the end of the frame A, opposite to the end to which the shaft L, is fixed, see Figs. 1 and 2.

Q, is a lever attached by a pivot (*x*), to the frame A; the outer end of this lever is forked, as shown clearly in Fig. 2, and one of the heads of the cylindrical frame M, is fitted within it. Through the lever Q, an arm (*y*), passes, having a weight (*z*), attached to it, said arm being secured at its lower end to a lever R, having its fulcrum at (*a′*), shown more particularly in Fig. 3. One end of the lever R, has a weight (*b′*), attached to it, and the opposite end works in a serrated spring catch S, shown more particularly in Figs. 1 and 3.

T, T′, are rods which work in suitable guides on the upper surface of one of the ways B, a rod being at each end of the way, see Figs. 1 and 2. The rods have projections (c'), (c'), attached to them. At the end of the rod T, there is attached a cord (d'), which passes around a small pulley, (e'), and is then secured to the lever R, see Figs. 1 and 3. At the end of the rod T', a cord (f') is attached, said cord passing around small pulleys, (g'), (g'), and its end secured to a small lever, (h'), which acts against the upper part of the spring catch S, see Figs. 1 and 3. Underneath the frame A, there is a carriage U, see Figs. 1 and 2, in which the log or timber W, to be operated upon, is secured. This carriage works upon the ways V, V, placed transversely with the frame A, so that the carriage may be moved out laterally from underneath the frame, and the log or timber properly adjusted upon it.

Operation. The log or timber W, to be sawed, is properly secured upon the carriage U, and the carriage placed underneath the frame A. Motion is then communicated to the shaft G, in any proper manner, and the saw, D, is made to rotate by means of the band pulleys, H, (b), (c), (f), and the carriage C, is moved along by means of the band pulleys, (j'), (k), communicating motion to the shaft L, on which are hung the two loose pulleys (l), (m), said pulleys alternately communicating motion to the carriage C, in consequence of the band O, the ends of which are attached to the carriage, C, the band O, passing around the pulley (o), on the shaft, N. The saw D, as the carriage is moved horizontally along, cuts the log or timber its entire length, the frames E and F, changing their position as the carriage moves, so that the band pulleys H, (b), (c), (f), are at all times at equal distances from each other, at whatever part of the log or timber the saw may be. The carriage has a reciprocating motion. The movement of the carriage C, is changed at the end of the stroke, by means of the carriage striking the projections (c'), on the rods, T, T',—the rod T, as it is moved, operating the lever R, and throwing the sliding frame M, in connection with the loose pulley (m), and thereby causing said pulley (m), to turn with the shaft L, the pins (t), (u), being in contact with each other. The carriage then moves in the direction indicated by the arrow, Fig. 1, and when at the end of the log or timber as shown in red in Fig. 1, the rod T', is moved by the carriage, and the small lever (h'), throws out the spring catch S, and liberates the lever R, which falls by means of the weights (z). (b'), and the lever Q, throws the sliding cylindrical frame M, in contact with the pulley (l), and a reverse or return motion is consequently given the carriage. The log carriage U, may be moved, or operated in any proper manner for the succeeding cuts.

By the above invention, no time is lost in moving the log, as the log or timber remains stationary while being sawed, the saw moving back instead of the log, and with a quick movement. The log may be sawed of taper form, by securing it in the proper position in the carriage U. A large building is not required as usual, as no length of room is required to accommodate the log each side of the saw. The length of the building need not exceed the length of the translation of the carriage.

I do not claim a saw placed in a reciprocating or traveling carriage, irrespective of the construction and arrangement herein shown, for they have been previously used. But

What I claim as new and desire to secure by Letters Patent, is:—

Sawing timber, by placing a saw D, within a carriage C, attached to frames, E, F, jointed or connected together, and operating in the manner substantially as herein shown and described.

BENJN. FULGHUM.

Witnesses:
JAMES M. POE,
ELLIS NORDYKE.